United States Patent [19]

Frederickson

[11] 3,991,469

[45] Nov. 16, 1976

[54] SAFETY BRAKING MECHANISM FOR A PORTABLE CHAIN SAW

[75] Inventor: Robert E. Frederickson, Southgate, Calif.

[73] Assignee: McCulloch Corporation, Los Angeles, Calif.

[22] Filed: Dec. 16, 1975

[21] Appl. No.: 641,159

Related U.S. Application Data

[63] Continuation of Ser. No. 515,045, Oct. 15, 1974, abandoned.

[52] U.S. Cl. .................................... 30/381; 30/383; 188/77 R; 188/166

[51] Int. Cl.² .......................................... B23D 57/02

[58] Field of Search .............. 30/381, 383; 192/130, 192/129 R; 188/77 R, 166

[56] References Cited

UNITED STATES PATENTS

| | | | |
|---|---|---|---|
| 3,292,742 | 12/1966 | Thomas | 188/166 |
| 3,776,331 | 12/1973 | Gustafsson | 30/381 |
| 3,937,306 | 2/1976 | Naslund et al. | 30/383 |

*Primary Examiner*—James L. Jones, Jr.
*Attorney, Agent, or Firm*—Burns, Doane, Swecker & Mathis

[57] ABSTRACT

A portable chain saw includes a flexible brake band for stopping the cutter chain. A sensing arm is pivotally mounted on the chain saw housing, with the brake band being connected to this sensing arm. The sensing arm is arranged to be engaged by an arm or hand of an operator so as to be swung forwardly in a brake-tightening manner. The sensing arm is continuously biased forwardly to a braking position by a coil compression spring. A latch normally holds the sensing arm in a rest position. The latch comprises a metallic strip one end of which is fixedly secured to the housing. The other end of the strip has a bent configuration defining a notch for receiving a curved projection of the sensing arm to retain the latter. The strip extends forwardly from the housing in overlying position above the spring and projection. The strip is flexed upwardly when the sensing arm is struck by an arm or hand of an operator, the latch is shifted to an unlatching position, allowing the coil compression spring to ram the sensing arm forwardly to tighten the brake band and stop the cutter chain. The mechanism can be conveniently reset by retracting the sensing arm to its rest position, wherein automatic cocking of the sensing arm occurs.

9 Claims, 6 Drawing Figures

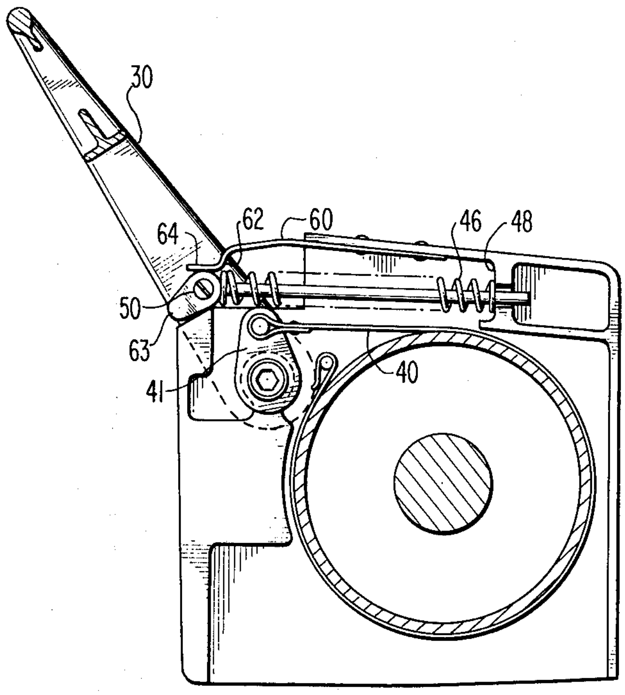
FIG.4
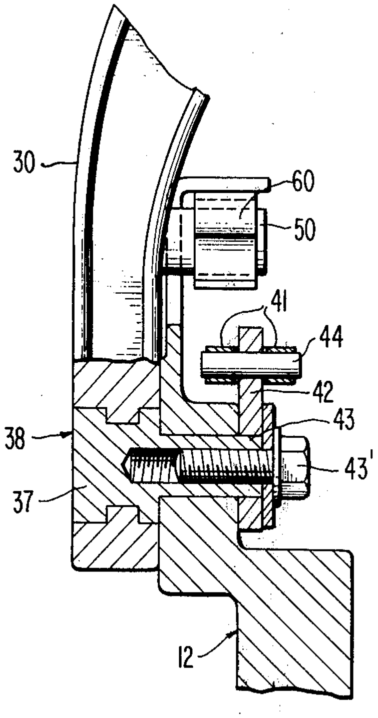
FIG.5
FIG.6
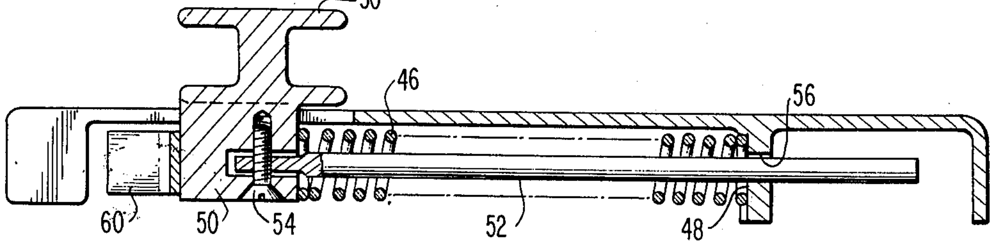

SAFETY BRAKING MECHANISM FOR A PORTABLE CHAIN SAW

This is a continuation, of application Ser. No. 515,045, filed Oct. 15, 1974, now abandoned.

BACKGROUND OF THE INVENTION

This invention relates to a safety mechanism for manually portable chain saws. More particularly, the invention relates to safety apparatus for minimizing the possibility of a chain saw operator being injured by a cutting chain.

Manually portable chain saws typically comprise an engine-carrying housing, a cutter bar projecting forwardly from the housing, and an engine-driven cutter chain entrained for endless movement around the cutter bar. The chain saw is designed to be utilized by an operator grasping the machine with both hands. An operator's one hand normally holds a gripping handle mounted on the housing, while the other hand engages a housing control handle for actuating a trigger throttle mechanism.

In some instances of cutting operation, the cutting chain may encounter resistance of a type causing the cutter bar to violently kick upwardly in a manner commonly referred to as "kickback". The abrupt action of kickback may cause an operator's hand to slip from the gripping handle and travel toward the cutting chain, or jerk the cutting chain toward the operator's arm or chest.

It has been estimated that approximately 60% of all chain saw related accidents are either directly or ultimately attributable to this kickback phenomenon.

In still other instances of cutting operation wherein an operator applies downward and forward pressure on the gripping handle, there is a possibility of the operator's hand slipping from the gripping handle and traveling toward the cutting chain.

Experience indicates that if an operator's hand does accidentally engage the rapidly moving cutting chain, the hand can be badly mutilated and/or severed.

Proposals have been heretofore offered which have significantly advanced the state of chain saw safety. These proposals are disclosed in Moore U.S. application Ser. No. 109,574, now U.S. Pat. No. 3,739,475, issued June 19, 1973; Moore U.S. application Ser. No. 294,866, now U.S. Pat. No. 3,793,727, issued Feb. 26, 1974; and Dooley U.S. Pat. application Ser. No. 354,776, now U.S. Pat. No. 3,839,795, issued Oct. 8, 1974, all assigned to the assignee of the present invention. Notwithstanding, however, the significant advancements which these inventions constitute, room for further improvement in the art remains.

Other chain saw safety proposals have been proffered as can be seen, for example, in U.S. Gustafsson Pat. No. 3,776,331, issued Dec. 4, 1973; U.S. Mattsson et al Pat. 3,664,390, issued May 23, 1972; U.S. Irgens Pat. 3,361,165, issued Jan. 2, 1965; U.S. Kiekhaefer Pat. No. 2,610,657, issued Sept. 16, 1952; and British Pat. No. 1,351,546, published May 1, 1974.

Among the proposals heretofore made in relation to chain saw safety mechanisms, many involve braking systems which are not capable of imposing sufficient braking forces to stop the cutter chain soon enough. Moreover, the safety systems may be characterized by numerous mechanical components or relatively complicated arrangements, which are not only more expensive to install and more susceptible to failure, but also occupy too much space on a chain saw housing. It will be appreciated, in this connection, that weight and size requirements of a manually portable chain saw dictate that a safety mechanism be effective, yet involve a minimal number of parts that are capable of compact arrangement.

Many of the previously proposed safety proposals require that the operator continually hold an activating lever in retracted position during chain saw operation to prevent activation of a safety brake. It will be apparent that such an arrangement greatly limits the manipulative freedom of the operator who is restricted to gripping the chain saw in a manner suited for retracting the lever.

In maximizing the effectiveness and convenience of chain saw safety mechanism, it would be desirable to provide a chain saw braking apparatus that is capable of exerting each time a strong, substantially constant braking force, the intensity of which being substantially independent of the manner of actuation. Moreover, such a braking apparatus should be simplistic and compact in design so as to exhibit a minimal chance of malfunction as well as occupy little space on the chain saw housing.

It is, therefore, an object of the invention to alleviate or solve problems of the types discussed above.

It is another object of the invention to provide a chain saw braking mechanism which rapidly and effectively stops a cutter chain in response to the sensing of a dangerous condition.

It is an additional object of the invention to provide such a braking mechanism which is simplistic and compact in design.

It is a further object of the invention to provide such a safety braking mechanism which affords significant manipulative freedom for the operator in supporting and guiding the chain saw.

It is still another object of the invention to provide such a safety braking mechanism which is activated in response to engagement between the hand or arm of an operator and a sensing lever to apply a substantially constant braking force which is independent of the force with which the operator engages the sensing lever.

It is a further object of the invention to provide such a safety braking mechanism which is fast-acting and which can be conveniently recocked.

BRIEF SUMMARY OF THE PREFERRED EMBODIMENTS OF THE INVENTION

These and other objects are achieved by the present invention in which a manually portable chain saw includes a housing, a manual gripping handle mounted on the housing, an engine carried by the housing, a cutting chain, a support bar projecting forwardly from the housing for supporting the cutting chain for endless movement, a rotation transmission operably connected to the engine for driving the cutting chain, and a safety braking mechanism for stopping the cutting chain. The safety braking mechanism includes a sensing arm which is mounted on the housing for swinging movement. A portion of the sensing arm is located in front of the gripping handle during operation of the chain saw and is arranged to be swung in response to being struck by an arm or hand of an operator. A flexible brake band is provided and includes a first end anchored to the housing and a second end coupled to the sensing arm for movement therewith. The arrangement is such that as the sensing arm is swung, it shifts the brake band into frictional braking relationship with the rotation transmission to stop the cutting chain. A multi-stage brake control mechanism is provided and is operably connected to the sensing arm. This control means resists swinging movement of the sensing arm during a first control stage, and positively swings the sensing arm during a second control stage in response to engagement of the sensing arm by an arm or hand of an operator to shift the brake band into braking relationship with the rotation transmission to stop the cutting chain.

Preferably, the multi-stage brake control means includes a coil spring which constantly biases the sensing arm toward swinging movement to brake the rotation transmission, and a latch mounted on the housing for resisting swinging movement of the sensing arm. The latch comprises a strip having a first end fixedly secured to the housing. A second end of the strip has a bent configuration defining a notch for receiving a curved projection of the sensing arm. The strip extends forwardly from the housing in overlying position above the spring and projection. The strip is flexed upwardly to an unlatching position in response to engagement of the sensing arm by an arm or hand of an operator to allow the coil spring to bias the sensing arm into a braking position.

THE DRAWING

Other objects and advantages of the present invention will become apparent from the subsequent detailed description thereof in which like numerals designate like elements, and in which:

FIG. 4 is a view similar to FIG. 3 wherein the braking system is in a braking posture;

FIG. 5 is a fragmentary, sectional view of the chain saw housing, taken along line 5—5 of FIG. 3; and FIG. 6 is a fragmentary, sectional view of the chain saw housing, taken along line 6—6 of FIG. 3.

DETAILED DESCRIPTION OF PREFERRED EMBODIMENTS OF THE INVENTION

Figure 1:
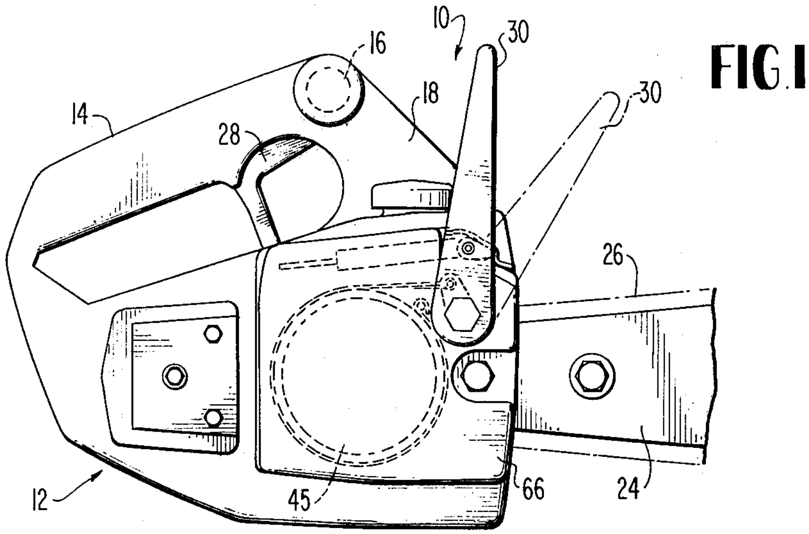
FIG. 1 is a side elevational view of a portion of a chain saw in accordance with the present invention.
Figure 2:
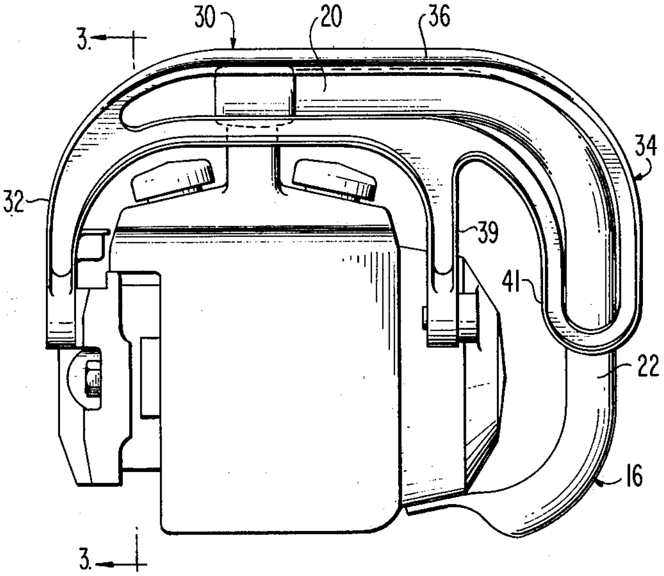
FIG. 2 is a front view of the chain saw housing according to the invention.

In FIG. 1 there is depicted a preferred form of the invention embodied in a manually portable chain saw. The chain saw 10 includes a housing 12 which carries an internal combustion engine in conventional fashion. The housing 12 includes a control handle 14 mounted at the rear of the housing and a gripping handle 16 mounted near the front of the housing. The gripping handle includes top and side portions 18, 20, 22 (FIG. 2).

A cutter or guide bar 24 projects forwardly from the housing 12 and supports a saw chain or cutter chain 26 for endless movement therearound. The cutter chain is driven by a suitable power transmission from the internal combustion engine. The power transmission per se does not constitute the present invention, hence any suitable conventional power transmission assembly may be utilized, such as those disclosed for example, in U.S. Pat. Nos. to Moore et al 2,947,399; COllins 3,385,411; and Hazzard 3,425,411, all assigned to the assignee of the present invention and all being incorporated herein by reference.

Usually, the power transmission includes a chain sprocket wheel which is rotated by the engine drive shaft and around which is arranged the cutter chain 26. Rotation of the chain sprocket wheel drives the cutting chain in endless fashion around the cutter bar.

During use of the chain saw 10 an operator typically grasps the control handle 14 with one hand and the gripping handle 16 with the other hand. The gripping handle 16 is primarily used to manipulate and apply pressure to the chain saw, while the control handle 14 is utilized to stabilize the saw and control the rate of travel of the cutting chain through operation of a trigger throttle 28. The operator is able to grasp various portions of the gripping handle 16 in order to properly orient the cutter chain.

As noted earlier, the kickback phenomenon can occur without warning so as to endanger the safety of the operator. In order to minimize this danger, the present invention involves the provision of a chain saw safety system.

In its preferred form the safety system includes a sensing arm 30 which is mounted for swinging movement on the housing. The safety arm is a generally inverted U-shaped member (FIG. 2) having essentially vertically extending side sections 32, 34 and a horizontally extending top section 36. One of the side sections 32 is pivotally mounted to the housing by a pivot 38 so that the sensing arm is located in front of the gripping handle 16. The other side portion 34 preferably includes a portion 39 which is also pivoted to the housing, as well as a portion 41 which overlies most of the side 22 of the gripping handle 16.

In short, the sensing arm 30 is arranged to lie between the gripping handle 16 and the cutting chain 26 so as to be engaged by an arm or hand of an operator that approaches too closely the cutter chain. A dangerous condition of this type can occur, for example, should an operator's hand slip from the gripping handle, or if the chain saw kicks back unexpectedly.

In any event, it will be appreciated that the sensing arm is deployed so as to be swung forwardly upon being struck by an operator's arm or hand.

Operably connected to the sensing arm 30 is a brake assembly. The brake assembly includes a flexible brake band 40 (FIG. 3) which is anchored at one end, by a pin 40' for example, to the housing 12.

The other end of the brake band, a looped end 41, is attached to a crank lever 42 of the sensing arm 30. In this connection, it will be noted that the pivot 38 of the sensing arm 30 includes a shaft 48 which rotates with the sensing arm and which extends through an annular opening in the housing 12 so as to be rotatably mounted in the housing. A bolt 43' secures the shaft to the housing 12. The crank lever 42 is attached to the shaft 42 for rotation therewith. A pin 44 extends tranversely through the crank lever and receives bifurcated sections of the looped end 41 of the brake band.

The brake band 40 is disposed around the peripheral surface of a brake drum 45. The brake drum 45 comprises a rotary element that is coupled to the power transmission of the chain saw such that braking forces which are applied to the drum will serve to slow the cutter chain. For example, the drum 45 can be coupled to a shaft 45' driven by the engine, or to a sprocket wheel which drives the cutter chain. Alternatively, in those instances wherein a centrifugal clutch is utilized, such as disclosed in the previously mentioned Moore et al, Collins, and Hazzard patents, the cup of the clutch may advantageously serve as the brake drum.

In any event, as the chain saw engine and power transmission rotate the cutting chain, the drum 15 will also be rotated. Should a braking force be applied to the drum 45, such force will be transmitted in a manner braking the cutter chain. It will be noted, however, that the brake drum is, under normal operating conditions, free-turning and does not interfere with or place limitations upon the cutting chain power transmission.

The sensing arm 30 is rotatable between a rest position (FIG. 3), constituting a normal operating position thereof, and a braking position (FIG. 4) in which the sensing arm has been swung forwardly. In the rest position of the sensing arm, the brake band 40 is in a non-braking posture disposed loosely around the drum 45 so that no braking forces are exerted. In the braking position of the sensing arm, the brake band 40 is in a braking posture, i.e. it has been tightened against the brake drum 45. Thus, the brake band is placed in frictional braking relationship with the power transmission to brake the cutter chain to a halt.

The flexible brake band presents a highly efficient braking element for a chain saw in that, being flexible, it is capable of engaging and exerting frictional forces against a substantial portion of the drum periphery.

In accordance with the present invention, a brake control mechanism is provided to resist swinging movement of the sensing arm during a first control stage and positively swing the sensing arm forwardly during a second control stage.

Preferably the brake control mechanism includes a coil compression spring 46 which exerts a continuous forward bias on the sensing arm 30. The spring 46 is compressibly confined between a shoulder 48 of the housing 12 (FIG. 3) and a lateral projection 50 of the sensing arm.

In order to brace the spring 46 and retain it within its confined posture, a rod 52 passes through the spring 46. One end of the rod is attached by a screw 54 to the projection 50. The other rod end passes through a guide opening 56 in the housing 12. The rod thus sits within the spring 46 and is free to travel with the sensing arm 30.

Figure 3:
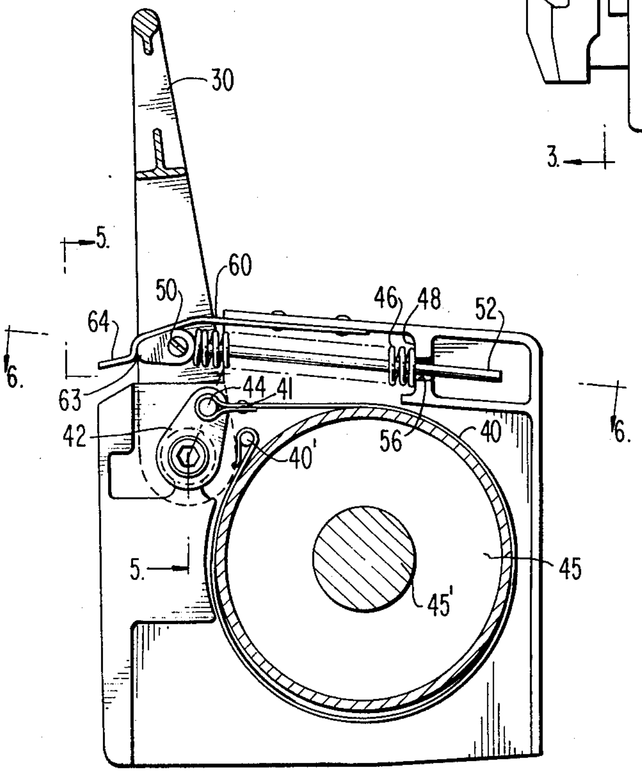
FIG. 3 is a side view of a safety braking system forming a part of the chain saw, with the braking system being in a non-braking posture.

In order to restrain the sensing arm against forward movement a latch 60 is provided. The latch 60 comprises a metallic strip which is anchored at one end to the housing 12. The other, free end of the latch 60 is bent to define a notch 62. This notch 62 is configured to receive and grasp a curved nose portion 63 of the projection 50 (FIG. 3). The latch thus extends forwardly from its fixed connection with the housing in overlying position above the spring 46 and the projection 50 to flexibly receive the projection, and thereby resists forward movement of the sensing arm 30 during a first control stage. Under sufficient urging from the sensing arm 30, such as when the sensing arm is struck by the arm or hand of an operator, the projection 50 shifts the latch 60 from a latching posture to an unlatching posture (FIG. 4). With the sensing arm becoming unlatched, it is able to be rammed forwardly by the compression spring 46 during a second control stage.

The latch 60 includes a reset lip 64 which extends forwardly of the notch 62. When the sensing arm 30 travels to its braking position, the projection 50 rides below the reset lip 64 so as to keep the latch in a raised posture. In this fashion, recocking of the sensing arm is effected merely by manually retracting the sensing arm 30 so that the projection 50 re-enters the notch 62 and the latch 60 shifts back into latching engagement therewith.

A cover 66 may be disposed over the braking mechanism to shield the components thereof.

OPERATION

In utilizing the chain saw 10, the housing is manually supported and maneuvered by an operator who grasps the control handle 14 and the gripping handle 16. The sensing arm 30 is normally retained in a rest position by the latch 60 (FIG. 3). The latch 60 effectively resists the forwardly directed urgings which are being continuously applied to the sensing arm by the coil compression spring 46. In the event that the cutter bar kicks upwardly toward the operator's chest, or that the operator's hand slips from the gripping handle 16, such that the hand or arm of the operator approaches too closely the cutting chain 26, the sensing arm 30 will be struck and urged forwardly. When this occurs, the latch 60 will be shifted to an unlatching posture, allowing the sensing arm 30 to be swung forwardly by the biasing action of the coil compression spring 46 (FIG. 4). Thus, the brake band 40 is tightened around the periphery of the brake drum 45 and the cutting chain is brought swiftly to a halt.

It will be understood that once the cutter chain has been halted, and the operator regains a firm grasp of the gripping handle 16, operation of the chain saw may be resumed by manually retracting the sensing arm 30. In so doing, the projection 50 will ride along the reset lip 64 and re-enter the notch 62. As a result, the brake band 40 will be slackened relative to the brake drum 45 and the sensing arm 30 will be effectively recocked (FIG. 3).

SUMMARY OF MAJOR ADVANTAGES AND SCOPE OF THE INVENTION

It will be apparent that the safety brake system of the present invention effects rapid stoppage of the cutter chain while affording the operator a great deal of freedom in gripping and manipulating the chain saw at various locations. That is, the operator can grab essentially any portion of the gripping handle while still being protected by the sensing arm which overlies the strategic points of the gripping handle.

The brake is normally held in a non-braking position and is swiftly swung to a braking position by means of a power mechanism that requires few elements and which occupys little space on the housing. Consequently, the mechanism is not susceptible to failure and adds little expense, weight, and size to the chain saw. These features can be demonstrated in that the safety braking system of the present invention requires the use of only a single spring, namely the coil compression spring which biases the sensing arm and the brake band to a braking position.

The use of a flexible brake band is useful in assuring that friction forces are imposed against the brake drum about a substantial portion of its periphery.

The safety mechanism of the present invention can be conveniently reset subsequent to being activated so that little working time is lost.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a manually portable chain saw having housing means; manual gripping handle means mounted on said housing means; engine means carried by said housing means; a cutting chain; support bar means projecting forwardly from said housing means for supporting said cutting chain for endless movement; rotation transmitting means operably connected to said engine for driving said cutting chain; and safety braking means for stopping said cutting chain, said safety braking means comprising:

sensing arm means mounted on said housing means for swinging movement;

said sensing arm means being located adjacent said gripping handle means and arranged to be swung in response to being engaged by an arm or hand of an operator;

said sensing arm means including a projection extending therefrom;

a flexible brake band including a first end anchored to said housing means and a second end coupled to said sensing arm means for movement therewith such that as said arm means is swung, it shifts said brake band into frictional braking relationship with said rotation transmitting means to stop said cutting chain; and multi-stage brake control means including:

spring means constantly biasing said sensing arm means toward swinging movement to brake said rotation transmitting means, and a latch for releasably retaining said sensing arm means, said latch comprising a strip having first and second ends;

said first end being fixedly secured to said housing;

said second end being configured to flexibly receive said projection so as to normally resist forward movement of said sensing arm means, and to be flexed in response to engagement of said sensing arm means by an arm or hand of an operator, to release said sensing arm means and allow said spring means to bias said brake band into braking relationship with said rotation transmission means.

2. A manually portable chain saw according to claim 1 wherein said second end of said strip includes a reset lip extending forwardly of said notch.

3. A manually portable chain saw according to claim 1 wherein said second end of said brake band is connected to a second projection on said sensing arm means, said second projection being fastened to a crank arm lever of said sensing arm.

4. A manually portable chain saw according to claim 3 wherein said second projection comprises a pin extending from both sides of said crank arm lever, said second end of said brake band being bifurcated and mounted on said pin at both sides of said crank arm lever.

5. A manually portable chain saw according to claim 1 wherein said coil spring comprises a compression spring.

6. A manually portable chain saw according to claim 5 including a rod connected to said sensing arm and passing through a guide opening in said housing means; said coil compression spring being disposed around said rod and being compressably disposed between said first projection of said sensing arm and an abutment shoulder on said housing means.

7. In a manually portable chain saw having housing means; manual gripping handle means mounted on said housing means; engine means carried by said housing means; a cutting chain; support bar means projecting forwardly from said housing means for supporting said cutting chain for endless movement; rotation transmitting means operably connected to said engine for driving said cutting chain; and safety braking means for stopping said cutting chain, said safety braking means comprising:

a sensing arm mounted on said housing means for swinging movement, said sensing arm being located adjacent said gripping handle means and arranged to be swung forwardly from a rest position to a braking position in response to being engaged by an arm or hand of an operator, said sensing arm having:

a first projection extending therefrom, said first projection including a curved forward portion, a crank arm lever rotatable with said sensing arm, and a second projection on said crank arm lever;

a flexible brake band including a first end anchored to said housing means and a second end coupled to said second projection for movement therewith such that as said arm means is swung forwardly, it shifts said brake band into frictional braking relationship with said rotation transmitting means to stop said cutting chain; and brake control means comprising:

a coil spring constantly biasing said sensing arm toward forward swinging movement to brake said rotation transmitting means, and a latch for releasably retaining said sensing arm means, said latch comprising a strip having first and second ends;

said first end being fixedly secured to said housing;

said second end having a bent configuration defining a notch for receiving said curved portion of said first projection to resist forward movement of said sensing arm means;

said strip extending forwardly from said housing in overlying position above said spring means and said first projection such that said strip is flexed upwardly in response to engagement of said sensing arm means by an arm or hand of an operator, to release said sensing arm means and allow said spring means to bias said brake band into braking relationship with said rotation transmission means.

8. A manually portable chain saw according to claim 7 wherein said second end of said strip includes a reset lip extending forwardly of said notch.

9. A manually portable chain saw according to claim 7 wherein said second projection comprises a pin extending from both sides of said crank arm lever, said second end of said brake band being bifurcated and mounted on said pin at both sides of said crank arm lever.

* * * * *